(12) United States Patent
Wu et al.

(10) Patent No.: US 7,917,355 B2
(45) Date of Patent: Mar. 29, 2011

(54) WORD DETECTION

(75) Inventors: Jun Wu, Saratoga, CA (US); Tang Xi Liu, Beijing (CN); Feng Hong, Foster City, CA (US); Yonggang Wang, Beijing (CN); Bo Yang, Beijing (CN); Lei Zhang, Beijing (CN)

(73) Assignee: Google Inc., Mountain View, CA (US)

( * ) Notice: Subject to any disclaimer, the term of this patent is extended or adjusted under 35 U.S.C. 154(b) by 887 days.

(21) Appl. No.: 11/844,153

(22) Filed: Aug. 23, 2007

(65) Prior Publication Data
US 2009/0055168 A1 Feb. 26, 2009

(51) Int. Cl.
G06F 17/21 (2006.01)
G06F 17/27 (2006.01)
G06F 17/20 (2006.01)

(52) U.S. Cl. ................................. 704/10; 704/1; 704/9
(58) Field of Classification Search .................. None
See application file for complete search history.

(56) References Cited

U.S. PATENT DOCUMENTS

| | | | |
|---|---|---|---|
| 6,052,657 A | 4/2000 | Yamron et al. | |
| 6,128,613 A | 10/2000 | Wong et al. | |
| 6,167,368 A | 12/2000 | Wacholder | |
| 6,651,058 B1 | 11/2003 | Sundaresan et al. | |
| 6,711,577 B1 | 3/2004 | Wong et al. | |
| 7,024,624 B2 | 4/2006 | Hintz | |
| 7,478,033 B2 * | 1/2009 | Wu et al. | 704/2 |
| 7,680,649 B2 * | 3/2010 | Park | 704/10 |
| 2004/0225667 A1 | 11/2004 | Hu et al. | |
| 2005/0021324 A1 | 1/2005 | Brants et al. | |
| 2005/0278613 A1 | 12/2005 | Morinaga et al. | |
| 2007/0143101 A1 | 6/2007 | Goutte | |
| 2009/0055381 A1 | 2/2009 | Wu et al. | |

OTHER PUBLICATIONS

Ren, He. "A chinese word extraction algorithm based on information entropy," Journal of Chinese Information Processing, May 2006.*
Sui, Z. et al. "Automatic recognition of Chinese scientific and technological terms using integrated linguistic knowledge," Natural Language Processing and Knowledge Engineering, 2003. Proceedings. 2003 International Conference on, Oct. 26-29, 2003, pp. 444-451.*
He, S. et al. "Bootstrap method for Chinese new words extraction," Acoustics, Speech, and Signal Processing, 2001. Proceedings. (ICASSP '01). 2001 IEEE International Conference on, pp. 581-584 vol. 1.*
Jiang, W. et al. "An Improved Unknown Word Recognition Model based on Multi-Knowledge Source Method," Intelligent Systems Design and Applications, 2006. ISDA '06. Sixth International Conference on, Oct. 16-18, 2006, pp. 825-832.*
He et al., "An Approach to Automatically Constructing Domain Ontology", In: PACLIC 2006, Wuhan, China, Nov. 1-3, 2006.
Hitamitsu et al., "Topic Word Selection Based on Combinatorial Probability", NLPRS-2001, pp. 289-296, 8 pages.

(Continued)

*Primary Examiner* — Matthew J Sked
(74) *Attorney, Agent, or Firm* — Fish & Richardson P.C.

(57) ABSTRACT

Methods, systems, and apparatus, including computer program products, in which data from web documents are partitioned into a training corpus and a development corpus are provided. First word probabilities for words are determined for the training corpus, and second word probabilities for the words are determined for the development corpus. Uncertainty values based on the word probabilities for the training corpus and the development corpus are compared, and new words are identified based on the comparison.

28 Claims, 7 Drawing Sheets

OTHER PUBLICATIONS

Lavrenko et al., "Relevance Models for Topic Detection and Tracking", In Proceeding of HLT-2002, 12 pages.

Notification of Transmittal of the International Search Report and the Written Opinion of the International Searching Authority, or the Declaration, PCT/CN2008/072128, Dec. 4, 2008, 16 pages, 7 pages.

Notification Concerning Transmittal of International Preliminary Report on Patentability and the Written Opinion of the International Searching Authority, PCT/CN2008/072128, Mar. 4, 2010, 10 pages.

Ryu et al., "Determining the Specificity of Terms based on Information Theoretic Measures", CompuTerm 2004 Poster Session—$3^{rd}$ International Workshop on Computational Terminology, pp. 87-90, 4 pages.

USPTO Non-Final Office Action in U.S. Appl. No. 11/844,067, mailed Aug. 5, 2010, 19 pages.

Fish & Richardson P.C., Amendment in Reply to Action dated Aug. 5, 2010 in U.S. Appl. No. 11/844,067, filed Nov. 5, 2010, 17 pages.

\* cited by examiner

WORD DETECTION

BACKGROUND

This disclosure relates to dictionaries for natural language processing applications, such as machine translation, non-Roman language word segmentation, speech recognition and input method editors.

Increasingly advanced natural language processing techniques are used in data processing systems, such as speech processing systems, handwriting/optical character recognition systems, automatic translation systems, or for spelling/grammar checking in word processing systems. These natural language processing techniques can include automatic updating of dictionaries for natural language applications related to, e.g., non-Roman language word segmentation, machine translation, automatic proofreading, speech recognition, input method editors, etc.

Non-Roman languages that use a logographic script in which one or two characters, e.g., glyphs, correspond to one word or meaning have more characters than keys on a standard input device, such as a computer keyboard on a mobile device keypad. For example, the Chinese language contains tens of thousands of ideographic characters defined by base phonetic or Pinyin characters and five tones. The mapping of these many to one associations can be implemented by input methods that facilitate entry of characters and symbols not found on input devices. Accordingly, a Western style keyboard can be used to input Chinese, Japanese, or Korean characters.

An input method editor can be used to realize an input method. Such input method editors can include or access dictionaries of words and/or phrases. Lexicons of languages are constantly evolving, however, and thus the dictionaries for the input method editors can require frequent updates. For example, a new word may be rapidly introduced into a language, e.g., a pop-culture reference or a new trade name for a product may be introduced into a lexicon. Failure to update an input method editor dictionary in a timely manner can thus degrade the user experience, as the user may be unable to utilize or have difficulty utilizing the input method editor to input the new word into an input field. For example, a user may desire to submit a new word, e.g., a new trade name, as a search query to a search engine. If the input method editor does not recognize the new word, however, the user may experience difficulty in inputting the new word into the search engine.

In some languages such as Chinese, Japanese, That and Korean, there are no word boundaries in sentences. Therefore, new words cannot be easily identified in the text, as the new words are compounded sequences of characters or existing words. This makes new word detection a difficult task for those languages.

SUMMARY

Disclosed herein are methods, systems and apparatus for detecting new words in a word corpus, e.g., a collection of web documents. Such documents can include web pages, word processing files, query logs, instant messenger (IM) scripts, blog entries, bulletin board system (bbs) postings or other data sources that include word data.

In one implementation, a method determines first word frequencies for existing words and a candidate word in a training corpus, the candidate word defined by a sequence of constituent words, each constituent word being an existing word in a dictionary. Second word frequencies for the constituent words and the candidate word in a development corpus are determined. A candidate word entropy-related measure based on the second word frequency of the candidate word and the first word frequencies of the constituent words and the candidate word is determined. Additionally, an existing word entropy-related measure based on the second word frequencies of the constituent words and the first word frequencies of the constituent words and the candidate word is determined. The candidate word is determined to be a new word if the candidate word entropy-related measure exceeds the existing word entropy-related measure.

In another implementation, a method determines first word probabilities for existing words and a candidate word in a first corpus, the candidate word defined by a sequence of constituent words, each constituent word an existing word in a dictionary. Second word probabilities for the constituent words and the candidate word in the second corpus are determined. A first entropy-related value based on the second candidate word probability and the first word probabilities of the candidate word and the constituent words is determined. Additionally, a second entropy-related value based on the second constituent word probabilities and the first word probabilities of the candidate word and the constituent words are determined. The candidate word is a new word if the first entropy-related value exceeds the second entropy-related value.

In another implementation, a system includes a word processing module and a new word analyzer module. The word processing module is configured to access and partition a word corpus into a training corpus and a development corpus, and to generate first word probabilities for words stored in the training corpus and second word probabilities for the words in the development corpus. The words include a candidate word comprising two or more corresponding words. A new word analyzer module is configured to receive the first and second word probabilities and generate a first value based on the first word probabilities for the candidate word and the two or more corresponding words and the second word probability for the candidate word. The new word analyzer module is also configured to generate a second value based on the first word probabilities for the candidate word and the two or more corresponding words and the second word probabilities for the two or more corresponding words. The new word analyzer module is further configured to compare the first value to the second value and determine whether the candidate word is a new word based on the comparison.

The methods, systems and apparatus provided in the disclosure may facilitate the new word detection from text written in languages, e.g., languages without word boundaries in sentences, thus facilitating the updating of dictionaries for natural language processing applications in an easy and timely manner. Accordingly, the data processing performance of a system or device using languages without boundaries in sentences may be improved. For example, the system or device may have improved performance in speech processing, handwriting/optical character recognition, automatic translation, automatic classification, automatic abstracting, and/or spell/grammar checking in word processing systems.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
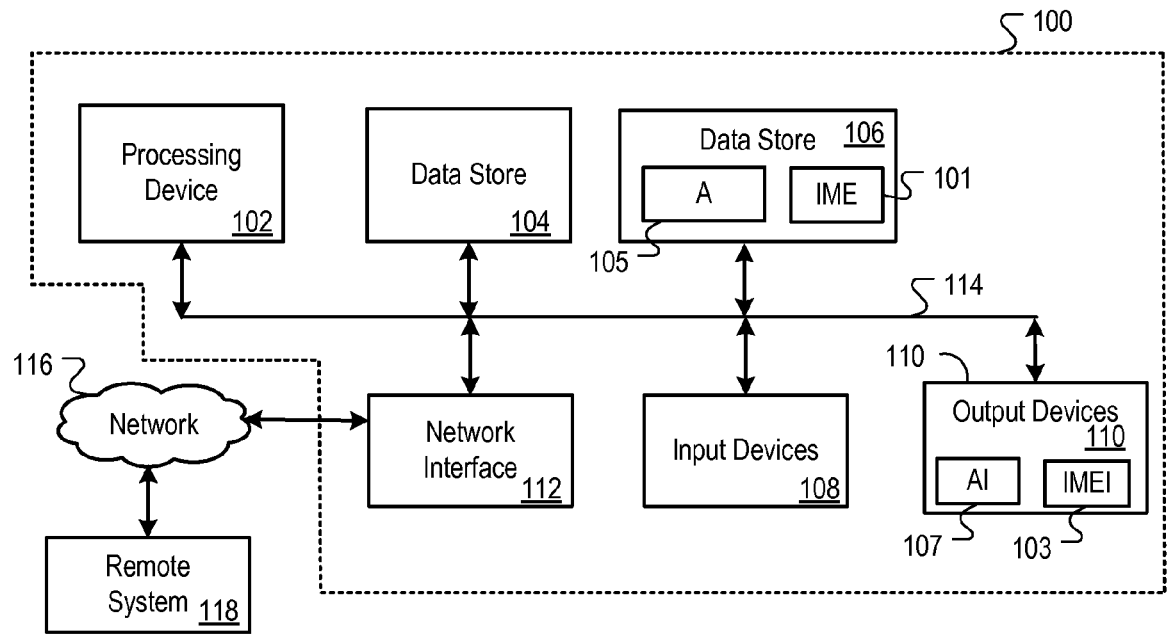
FIG. 1A is a block diagram of an example device 100 that can be utilized to implement an input method editor.

FIG. 1A is a block diagram of an example device 100 that can be utilized to implement an input method editor (IME). The device 100 can, for example, be implemented in a computer device, such as a personal computer device, a network server, a telecommunication switch, or other electronic devices, such as a mobile phone, mobile communication device, personal digital assistant (PDA), game box, and the like.

The example device 100 includes a processing device 102, a first data store 104, a second data store 106, input devices 108, output devices 110, and a network interface 112. A bus system 114, including, for example, a data bus and a motherboard, can be used to establish and control data communication between the components 102, 104, 106, 108, 110 and 112. Other example system architectures can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

Example input devices 108 can include a keyboard, a mouse, a stylus, a touch screen display etc., and example output devices 110 can include a display device, an audio device, etc. The network interface 112 can, for example, include a wired or wireless network device operable to communicate data to and from a network 116. The network 116 can include one or more local area networks (LANs) and/or a wide area network (WAN), such as the Internet.

In some implementations, the device 100 can include input method editor code 101 in a data store, such as the data store 106. The input method editor code 101 can be defined by instructions that upon execution cause the processing device 102 to carry out input method editing functions. In an implementation, the input method editor code 101 can, for example, comprise interpreted instructions, such as script instructions, e.g., JavaScript or ECMAScript instructions, which can be executed in a web browser environment. Other implementations can also be used, e.g., compiled instructions, a stand-alone application, an applet, a plug-in module, etc.

Execution of the input method editor code 101 generates or launches an input method editor instance 103. The input method editor instance 103 can define an input method editor environment, e.g., user interface, and can facilitate the processing of one or more input methods at the device 100, during which time the device 100 can receive composition inputs for input characters, ideograms, or symbols, such as, for example, Hanzi characters. For example, the user can use one or more of the input devices 108 (e.g., a keyboard, such as a Western-style keyboard, a stylus with handwriting recognition engines, etc.) to input composition inputs for identification of Hanzi characters. In some examples, a Hanzi character can be associated with more than one composition input.

The first data store 104 and/or the second data store 106 can store an association of composition inputs and characters. Based on a user input, the input method editor instance 103 can use information in the data store 104 and/or the data store 106 to identify one or more candidate characters represented by the input. In some implementations, if more than one candidate character is identified, the candidate characters are displayed on an output device 110. Using the input device 108, the user can select from the candidate characters a Hanzi character that the user desires to input.

In some implementations, the input method editor instance 103 on the device 100 can receive one or more Pinyin composition inputs and convert the composition inputs into Hanzi characters. The input method editor instance 103 can, for example, use compositions of Pinyin syllables or characters received from keystrokes to represent the Hanzi characters. Each Pinyin syllable can, for example, correspond to a key in the Western style keyboard. Using a Pinyin input method editor, a user can input a Hanzi character by using composition inputs that include one or more Pinyin syllables representing the sound of the Hanzi character. Using the Pinyin IME, the user can also input a word that includes two or more Hanzi characters by using composition inputs that include two or more Pinyin syllables representing the sound of the Hanzi characters. Input methods for other languages, however, can also be facilitated.

Other application software 105 can also be stored in data stores 104 and/or 106, including web browsers, word processing programs, e-mail clients, etc. Each of these applications can generate a corresponding application instance 107. Each application instance can define an environment that can facilitate a user experience by presenting data to the user and facilitating data input from the user. For example, web browser software can generate a search engine environment; e-mail software can generate an e-mail environment; a word processing program can generate an editor environment; etc.

In some implementations, a remote computing system 118 having access to the device 100 can also be used to edit a logographic script. For example, the device 100 may be a server that provides logographic script editing capability via the network 116. In some examples, a user can edit a logographic script stored in the data store 104 and/or the data store 106 using a remote computing system, e.g., a client computer. Alternatively, a user can edit a logographic script stored on the remote system 118 having access to the device 100, e.g., the device 100 may provide a web-based input method editor that can be utilized by a client computer. The device 100 can, for example, select a character and receive a composition input from a user over the network interface 112. The processing device 102 can, for example, identify one or more characters adjacent to the selected character, and identify one or more candidate characters based on the received composition input and the adjacent characters. The device 100 can transmit a data communication that includes the candidate characters back to the remote computing system.

Other implementations can also be used. For example, input method editor functionality can be provided to a client device in the form of an applet or a script.

Figure 1B:
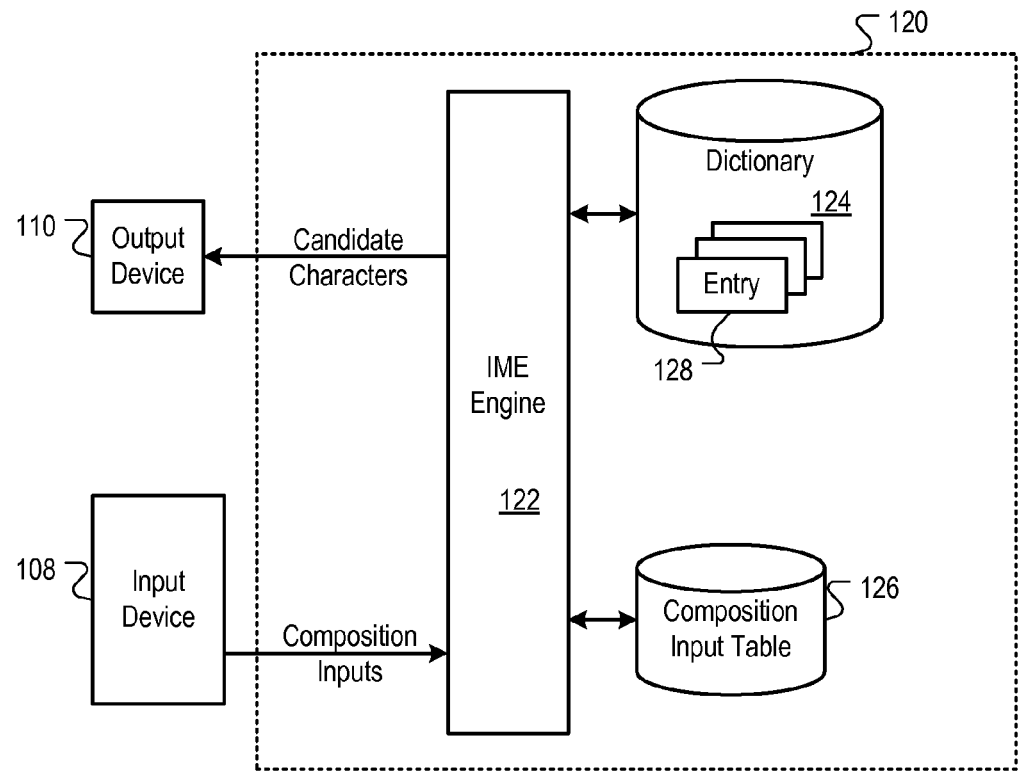
FIG. 1B is a block diagram of an example input method editor system 120.

FIG. 1B is a block diagram of an example input method editor system 120. The input method editor system 120 can, for example, be implemented using the input method editor code 101 and associated data stores 104 and 106. The input method editor system 120 includes an input method editor engine 122, a dictionary 124, and a composition input data store 126. Other implementation and storage architectures can also be used. In some implementations, the composition input data store 126 can include a language model. For example, the language model can be a probability matrix of a current word given at least one previous word (e.g., a unigram model).

In an implementation directed to the Chinese language, a user can use the IME system 120 to enter Chinese words or phrases by typing Pinyin characters. The IME engine 122 can search the dictionary 124 to identify candidate dictionary entries each including one or more Chinese words or phrases that match the Pinyin characters. The dictionary 124 includes entries 128 that correspond to known characters, words, or phrases of a logographic script used in one or more language models, and characters, words, and phrases in Roman-based or western-style alphabets, for example, English, German, Spanish, etc.

A word may include one Hanzi character or a sequence of consecutive Hanzi characters. A sequence of consecutive Hanzi characters may constitute more than one word in the dictionary 124. For example, a word ("苹果") having the meaning "apple" includes two constituent Hanzi characters "苹" and "果" that correspond to Pinyin inputs "ping" and "guo," respectively. The character "果" is also a constituent word that has the meaning "fruit." Likewise, the word "全球定位系统" constitutes of three words in the dictionary 124. The constituent words can include (1) "全球," meaning "global," (2) "定位," meaning "positioning," and (3) "系统," meaning "system." Each of the words "全球," "定位," and "系统" are likewise constituted of two constituent words that exist in the dictionary 124.

The dictionary entries 128 may include, for example, idioms (e.g., "胸有成竹"), proper names (e.g., "奥地利共和国", meaning "Republic of Austria"), names of historical characters or famous people (for example, "成吉思汗", meaning "Genghis Khan"), terms of art (e.g., "全球定位系统", meaning "Global Positioning System"), phrases (" 去不复"), book titles (for example, "红楼梦", meaning "Dream of the Red Chamber"), titles of art works (for example, "清明上河图" meaning "Upper River During the Qing Ming Festival"), and movie titles (for example, "卧虎藏龙", meaning "Crouching Tiger, Hidden Dragon"), etc., each including one or more characters. Similarly, the dictionary entries 128 may include, for example, names of geographical entities or political entities, names of business concerns, names of educational institutions, names of animals or plants, names of machinery, song names, titles of plays, names of software programs, names of consumer products, etc. The dictionary 124 may include, for example, thousands of characters, words and phrases.

In some implementations, the dictionary 124 includes information about relationships between characters. For example, the dictionary 124 can include scores or probability values assigned to a character depending on characters adjacent to the character. The dictionary 124 can include entry scores or entry probability values each associated with one of the dictionary entries 128 to indicate how often the entry 128 is used in general.

The composition input data store 126 includes an association of composition inputs and the entries 128 stored in the dictionary 124. In some implementations, the composition input data store 126 can link each of the entries in the dictionary 124 to a composition input (e.g., Pinyin input) used by the input method editor engine 122. For example, the input method editor engine 122 can use the information in the dictionary 124 and the composition input data store 126 to associate and/or identify one or more entries in the dictionary 124 with one or more composition inputs in the composition input data store 126. Other associations can also be used. The candidate selections in the IME system 120 can be ranked and presented in the input method editor according to the rank.

In some implementations, the input method editor engine 122 can use the language model of the composition input data store 126 to associate and/or identify the entries. For example, the IME system 120 can use the language model to rank the candidate associations based on one or more previous input words.

Some of the words and phrases stored in the dictionary 124 may have a long history in a lexicon, while other words and phrases may be relatively new. Because the lexicon of a language is constantly evolving, the dictionary 124 may require frequent updates. To facilitate an accurate and timely update, a word detection system can be utilized.

Figure 2A:
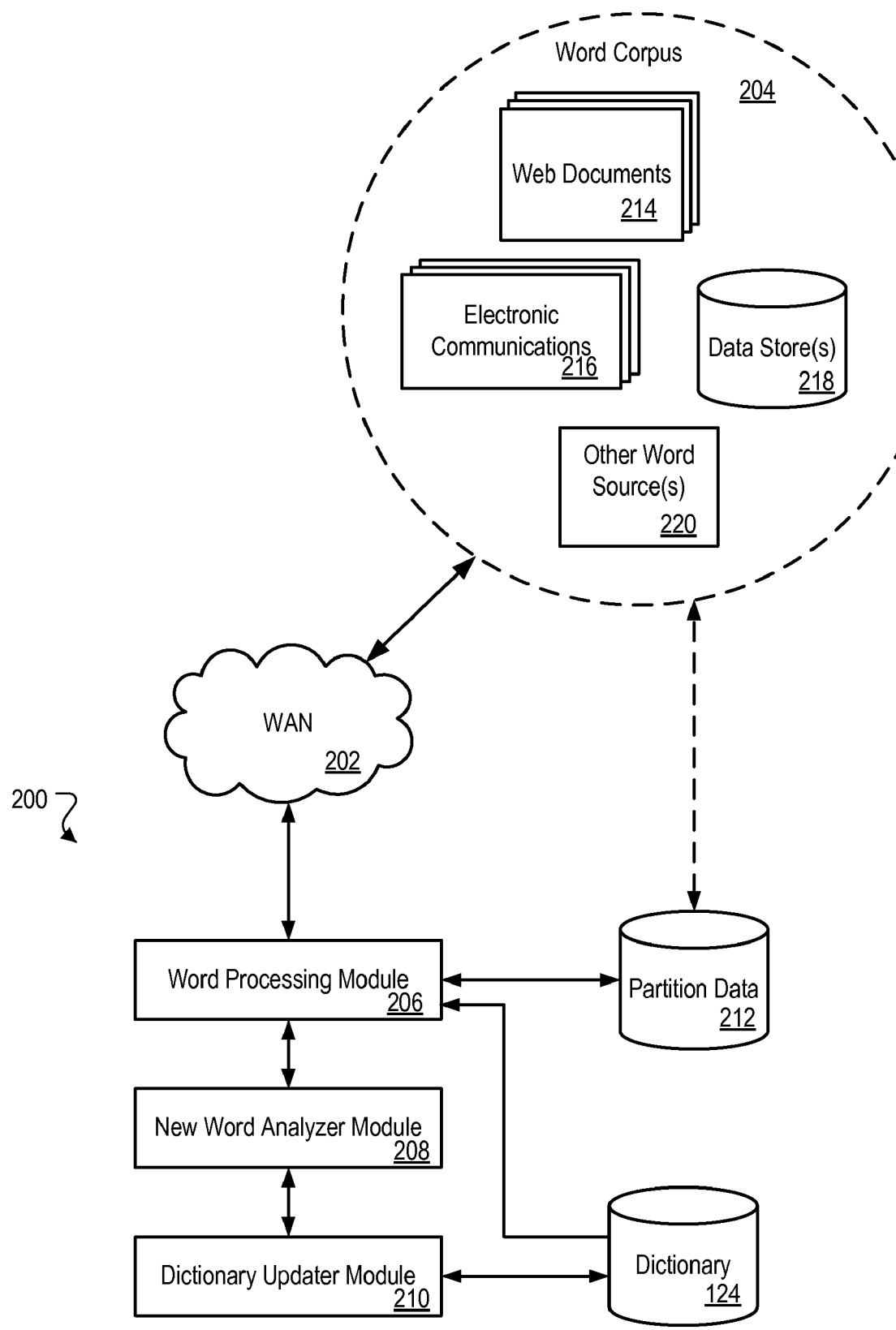
FIG. 2A is a block diagram of an example word detection system.

FIG. 2A is a block diagram of an example word detection system 200. The word detection system 200 includes a dictionary, e.g., a dictionary 124, a word processing module 206, a new word analyzer module 208, and a dictionary updater module 210. The word detection system can access a word corpus 204 over a network, e.g., a wide area network (WAN) 202, such as the Internet. The word detection system 200 can be configured to detect new words in the word corpus 204. For example, the word detection system 200 can identify new Chinese words defined by Hanzi characters from the word corpus 204. In some implementations, the word detection system 200 updates the dictionary 124 by storing the identified new words in the dictionary 124. For example, the word detection system 200 can add entries representing the new Chinese words into the dictionary 124. The dictionary 124 can then be provided to and/or accessed by computer devices utilizing an input method editor compatible with the dictionary 124.

The word processing module 206, the new word analyzer module 208, and the dictionary updater module 210 can be software and/or hardware processing modules configured to detect new words in the word corpus 204. An example software implementation of the modules includes instructions stored in a tangible computer-readable medium and executable by computer processing devices in data communication with the tangible computer-readable medium. Such instructions can include object code, compiled code, interpreted instructions, etc. In some implementations, the word processing module 206, the new word analyzer module 208, and the dictionary updater module 210 can be implemented in one or more networked server computers, e.g., a server farm, and can be configured to access and process a large word corpus, e.g., thousands or even millions of web-based documents. Other implementations can also be used.

The word corpus 204 includes words from various sources. An example word corpus can include web documents, such as web pages and files, query logs, blog, email messages, or other data that includes word data. In the depicted example, the word corpus 204 can include Hanzi characters from web documents 214, electronic communications 216, data stores 218, and other word sources 220. The web documents 214 can include published web pages accessible over the WAN 202. For example, the word corpus 204 can include words from personal or company websites, profile pages in social networking websites, blog entries, online news articles, and/or other text published on the Internet. The electronic communications 216 can include network communications, such as email, short message service (SMS), search queries, or other communication methods. For example, the word corpus 204 can include text used in e-mail messages, SMS messages, and search queries. In some implementations, the word corpus 204 can also include words from other data stores 218, such as on-line dictionaries associated with other IME devices, user files, etc. In some examples, the word corpus 204 can also include words used in other word sources 220, such as in electronic books, electronic dictionaries, user manuals of various devices in electronic form, or any other electronic source of word data.

In some implementations, the word corpus 204 can include words in documents of one or more languages. For example, a single document in the corpus 204 may include more than one language (e.g., an editorial in a Chinese newspaper about English politics can include both Chinese and English). In some implementations, the word processing module 206 can extract characters for a particular language, e.g., Hanzi characters, from the word corpus 204 for word detection.

In some implementations, the word processing module 206 can include a Hanzi character processing module. In one example, the Hanzi character processing module can process the Hanzi characters in the word corpus 204. In some examples, the word processing module 206 can include processing modules to process other logographic languages, such as a Japanese character processing module, a Korean character processing module, and/or other logographic character processing modules.

In some implementations, the word detection system 200 includes a partition data store 212. The partition data store 212 can include a copy of the word corpus 204 or a large portion of the word corpus, e.g., copies of web pages crawled by software agents, and the word processing module 206 can partition data stored in the partition data store 212. For example, the word processing module 206 can partition data related to the word corpus 204 into a training corpus and a development corpus. In some implementations, data in the training corpus and the development corpus can be stored in the partition data store 212. In some implementations, more than two partitions can be generated and stored in the partition data store 212.

In some implementations, the word processing module 206 can identify documents in the word corpus 204 and store document identifiers, e.g., uniform resource locators (URL) according to partition data in the partition data store 212. In these implementations, the partition data store 212 need not include a copy of the word corpus 204 or a copy of a large portion of the word corpus 204. Other data storage and/or allocation techniques for managing the word corpus 204 can also be used.

The word processing module 206 can include a language model. For example, the word processing module 206 can utilize the data in the word corpus 204 to generate an n-gram language model. The n-gram language model can include probabilities of a sub-sequence of n words from given sequences. The n-gram language model can include a unigram language model with n=1, a bigram language model with n=2, and/or a trigram language model with n=3, or other n-gram models. In certain implementations, the word processing module 206 can generate the n-gram language model for one or more of the partitioned data sets in the partition data store 212, e.g., the training corpus.

In some implementations, the word processing module 205 can identify words in the word corpus 204 without delimiters.

For example, the word processing module 206 can use the dictionary 124 and one or more existing language models to identify words in the word corpus 204. In one example, for a given sentence in the word corpus 204, the word processing module 206 can identify one or more combinations of words that form the sentence. Based on the language model, the word processing module 206 can, for example, rank the combinations and select a combination of words with the highest rank.

The word processing module 206 can compare the words in the training corpus and the words in the dictionary 124 to identify one or more potential new words, e.g., candidate words that appear in the training corpus and that are not in the dictionary 124. In some examples, the system 200 can verify whether a candidate word is a new word using the data in the partitioned data store 212. The word processing module 206 determines a first probability of the candidate word and the probabilities of words constituting the candidate word based on, for example, the n-gram language model in a training corpus (e.g., the training corpus), and a second probability based on, for example, a number of occurrences of the candidate word in the development corpus and the total number of words in the development corpus.

Using the first and second probabilities, the new word analyzer module 208 can determine whether the candidate word is a new word. In one example, the new word analyzer module 208 can use the first and second probabilities to determine whether an uncertainty in the development corpus, e.g., an entropy value, decreases with respect to the candidate word. In some implementations, the new word analyzer module 208 generates first and second entropy-related values based on the first and the second probabilities. For example, the first entropy-related value and the second entropy-related value may represent the uncertainty of the language models with and without the candidate word, respectively. In some implementations, the new word analyzer module 208 determines that the candidate word is a new word if the first entropy-related value is smaller than the second entropy-related value. The reduction of entropy can be indicative of an information gain (IG) resulting from correctly detecting the new word.

If the candidate word is determined to be a new word, the new word analyzer module 208 can notify the dictionary updater module 210 to update the dictionary 124 with the new word.

In some implementations, the entropy-related values can be an approximation of the actual entropy values. For example, the number of words in the training corpus and the development corpus may vary slightly by including the candidate word in the language model, e.g., the word "全球" may be counted as one word, or may be counted as two words if the constituent characters 全 and 球 are considered separately.

In one implementation, the new word analyzer module 208 can generate the entropy-related values using fixed sizes of the training corpus and the development corpus, e.g., by adjusting the probabilities for only a candidate word and the constituent words that define the candidate word. The entropy-related values are thus a close approximation of the actual entropy values. The new word analyzer module 208 can use the entropy-related values as the entropy values of the training corpus and/or the development corpus.

Figure 2B:
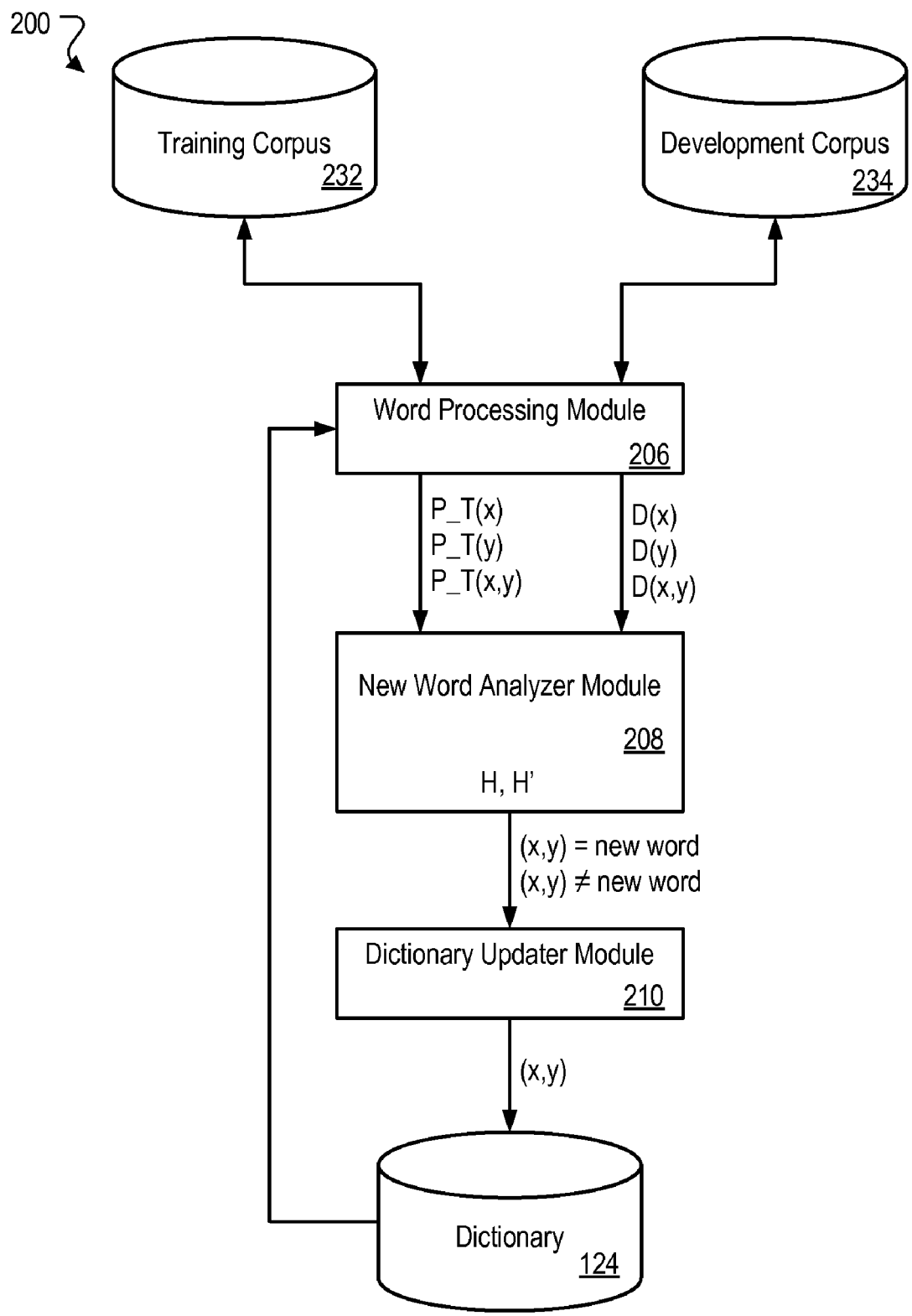
FIG. 2B is a block diagram of an example implementation of the system of FIG. 2A.

FIG. 2B is a block diagram of an example implementation of the system 200 of FIG. 2A. As shown in FIG. 2B, the system 200 includes a training corpus 232 and a development corpus 234. In some implementations, the word processing module 206 partitions the word corpus 204 to generate the training corpus 232 and the development corpus 234. For example, the training corpus 232 and the development corpus 234 can be stored or represented in the partition data store 212.

In some implementations, the word processing module 206 can include a segmentation module that segments raw sentences without spaces between words into word sequences. The segmentation module in the word processing module can, for example, utilize a dictionary and language models to generate the segments of word sequences.

As discussed above, the word processing module 206 can include an n-gram language model in the training corpus 232. In some implementations, the word processing module 206 can identify a candidate word by combining two or more existing words in the training corpus 232. For example, the word processing module 206 can identify a candidate word (x, y) by combining two existing words x and y.

In some implementations, the system 200 can utilize word data from the word corpus 204, e.g., web page data in the training corpus 232 and the development corpus 234, to determine whether the candidate word is a new word. For example, the word processing module 206 can generate an n-gram language model from data stored in the training corpus 232 to include an identified candidate word (x, y). The unigram model can include the probabilities of the candidate word, P(x, y), and the word processing module 206 can also determine the corresponding probabilities P(x) and P(y) of the words x and y that constitute the candidate word xy. Additionally, the word processing module 206 generates a word count value of the candidate word, D(x, y), and word count values of constituent words, D(x) and D(y) from the development corpus 234. For example, D(x), D(y), and D(x, y) may be the number of occurrences of x, y, and (x, y), respectively in the development corpus 234. Using the word count values, the system 200 can determine probabilities of x, y, and (x, y) in the development corpus 234. For example, the probability of (x, y) in the development corpus 234 can be determined by $$\frac{D(x, y)}{\|D\|},$$

where $\|D\|$ is the total number of words in the development corpus 234.

After receiving the probabilities p(x), p(y), and p(x, y), and the word count values D(x), D(y), and D(x, y), the new word analyzer module 208 determines whether the candidate word is a new word. In some implementations, the new word analyzer module 208 can determine that the candidate word is a new word if the uncertainty of the development corpus 234 decreases by including the candidate word as a new word. In some examples, an entropy value can be used to measure an uncertainty in the development corpus 234. For example, the entropy value of the development corpus 234 can be determined by $$H = -\sum_{w \in V} \frac{D(w)}{\|D\|} \cdot \log p(w),$$

where V is the entire set of words considered to compute the entropy H, w is a word in the development corpus 234, p(w) is the probability of the word in the development corpus, and D(w) is the number of occurrences of w in the development corpus.

In some implementations, the new word analyzer module 208 can generate entropy values H and H' for the development corpus 234, where H and H' are the entropy values of the development corpus 234 without and with, respectively, including the candidate word in the language models. In some implementations, the new word analyzer module 208 generates the actual entropy values H and H' using the actual sizes of a corpus without and with the candidate word, respectively. In some implementations, the new word analyzer module 208 can also use one or more entropy-related values that can approximate the actual entropy values. For example, the new word analyzer module 208 can generate H' using the size of the corpora 232, 234 without the candidate word. Although the size of the training and development corpora 232, 234 may decrease after including (x, y) as a new word in the vocabulary, the difference may be negligible for computing the entropy of the corpora 232, 234 with the candidate word (x, y). For example, if a sequence of n constituent words W1W2 ... Wn is considered a potentially new word, the size of the corpus decreases only by the number of occurrences of W1W2 ... Wn, e.g., m, multiplied by n−1, e.g., m*(n−1).

By comparing H and H', the new word analyzer module 208 can determine whether the candidate word is a new word. For example, if H'−H<0, then the new word analyzer module 208 may determine that the candidate word is a new word because the entropy value of the development corpus 234 is reduced by including the candidate word.

In some examples, the new word analyzer module 208 compares the entropy values H and H' using the probabilities p(x), p(y), and p(x, y), and the word count values D(x), D(y), and D(x, y). Because the word frequencies of words other than the candidate word and the constituent words are not affected by the addition of the candidate word, the formula for generating a difference between H and H' can be generated using a simplified formula. By cancelling equal terms, the following formula can be derived to compute the difference between H and H'

$$Z = H' - H$$

$$= -\left[\begin{array}{c}\frac{D(x, y)}{\|D\|} \cdot \log p'(x, y) + \frac{D(x) - D(x, y)}{\|D\|} \cdot \\ \log p'(x) + \frac{D(y) - D(x, y)}{\|D\|} \cdot \log p'(y)\end{array}\right] +$$

$$\left[\frac{D(x)}{\|D\|} \cdot \log p(x) + \frac{D(y)}{\|D\|} \cdot \log p(y)\right]$$

where p'(x), p'(y), p'(x, y), p(x), and p(y) are probabilities of the language models of the training corpus 232. The values of p'(x), p'(y), p'(x, y) are the probabilities of x, y, and (x, y), respectively, in the language model when the sequence of characters xy is considered a candidate word. Conversely, the values of p(x) and p(y) are probabilities of x and y, respectively, in the language model when the sequence of characters xy is not considered a candidate word. Thus, the value of p(x)>p'(x), and the value of p(y)>p'(y), as each occurrence of the sequence xy increases the respective probabilities of p(x) and p(y).

In an implementation, the new word analyzer module 208 can determine that the candidate word (x, y) is a new word if Z<0, which is equivalent to the condition:

$$\frac{D(x, y)}{\|D\|} \cdot \log\frac{p'(x, y)}{p'(x) \cdot p'(y)} \geq \frac{D(x)}{\|D\|} \cdot \log\frac{p(x)}{p'(x)} + \frac{D(y)}{\|D\|} \cdot \log\frac{p(y)}{p'(y)}$$

Accordingly, the candidate word (x, y) is determined to be a new word if the above inequality is true.

In some implementations, the probabilities p(x), p(y), p'(x), and p'(y) are represented using number of occurrences of x, y, and (x, y) in the training corpus 232 divided by the total number of words in the training corpus 232. For example, $$p'(x) = \frac{T(x) - T(x, y)}{\|T\|} = p(x) - p(x, y),$$

$$p'(y) = \frac{T(y) - T(x, y)}{\|T\|} = p(y) - p(x, y),$$

$$p(x) = \frac{T(x)}{\|T\|}, \text{ and}$$

$$p(y) = \frac{T(y)}{\|T\|},$$

where T(x), T(y), and T(x, y) are the number of occurrences of x, y, and (x, y), respectively, in the training corpus 232, and ||T|| is the total number of words in the training corpus 232. Thus, the new word analyzer module 208 can evaluate the above inequality according to the following inequality:

$$\frac{D(x, y)}{\|D\|} \cdot \log\frac{p'(x, y)}{p'(x) \cdot p'(y)} >$$
$$\frac{D(x)}{\|D\|} \cdot \log\frac{p(x)}{p(x) - p(x, y)} + \frac{D(y)}{\|D\|} \cdot \log\frac{p(y)}{p(y) - p(x, y)}$$

This inequality can be rewritten as:

$$\frac{D(x, y)}{\|D\|} \cdot \log\frac{p'(x, y)}{p'(x) \cdot p'(y)} >$$
$$\frac{D(x)}{\|D\|} \cdot \log\frac{T(x)}{T(x) - T(x, y)} + \frac{D(y)}{\|D\|} \cdot \log\frac{p(y)}{p(y) - p(x, y)}$$

to determine whether the candidate word is valid.

In an implementation, the new word analyzer module 208 can generate a first value using a word frequency of the candidate word in the development corpus 234 (e.g., $$\frac{D(x, y)}{\|D\|}\Big),$$

and the word frequencies of the candidate word and the constituent words in the training corpus 232 (e.g., p(x), p(y), and p(x, y)). A first entropy-like value V1 based on these values can be calculated based on the formula:

$$V1 = \frac{D(x, y)}{\|D\|} \cdot \log\frac{p(x, y)}{p(x) \cdot p(y)}.$$

Similarly, the new word analyzer module 208 can generate a second entropy value using a word frequency of the constituent words in the development corpus 234 (e.g., $$\frac{D(x)}{\|D\|} \text{ and } \frac{D(y)}{\|D\|}\Big),$$

and the word frequencies of the candidate word and the constituent words in the training corpus 232. A second entropy-like value Vs based on these values can be calculated based on the formula:

$$V2 = \frac{D(x)}{\|D\|} \cdot \log\frac{p(x)}{p(x) - (x, y)} + \frac{D(y)}{\|D\|} \cdot \log\frac{p(y)}{p(y) - (x, y)}.$$

In some implementations, the new word analyzer module 208 determines that the candidate word is a new word if V1>V2. Other inequalities can also be used to be more inclusive or less inclusive of new words, e.g., V1>S*V2, where S is a scalar value. The scalar value can be fixed, e.g., 0.9, or adjusted according to applications.

The dictionary updater module 210 receives data indicative of the determination from the new word analyzer module 208. In some implementations, if the new word analyzer module 208 determines that the candidate word is a new word, then the dictionary updater module 210 can add the new word into the dictionary 124.

The system 200 may process the word corpus 204 and process multiple candidate words on a scheduled basis. For example, the process of detecting new words in the corpus can be implemented on a daily, weekly, or monthly basis. Other triggering events can also be used; e.g., a new word detection process can be performed for a web-based input method editor if an unrecognized word is received as input with enough frequency to be statistically significant.

Figure 3:
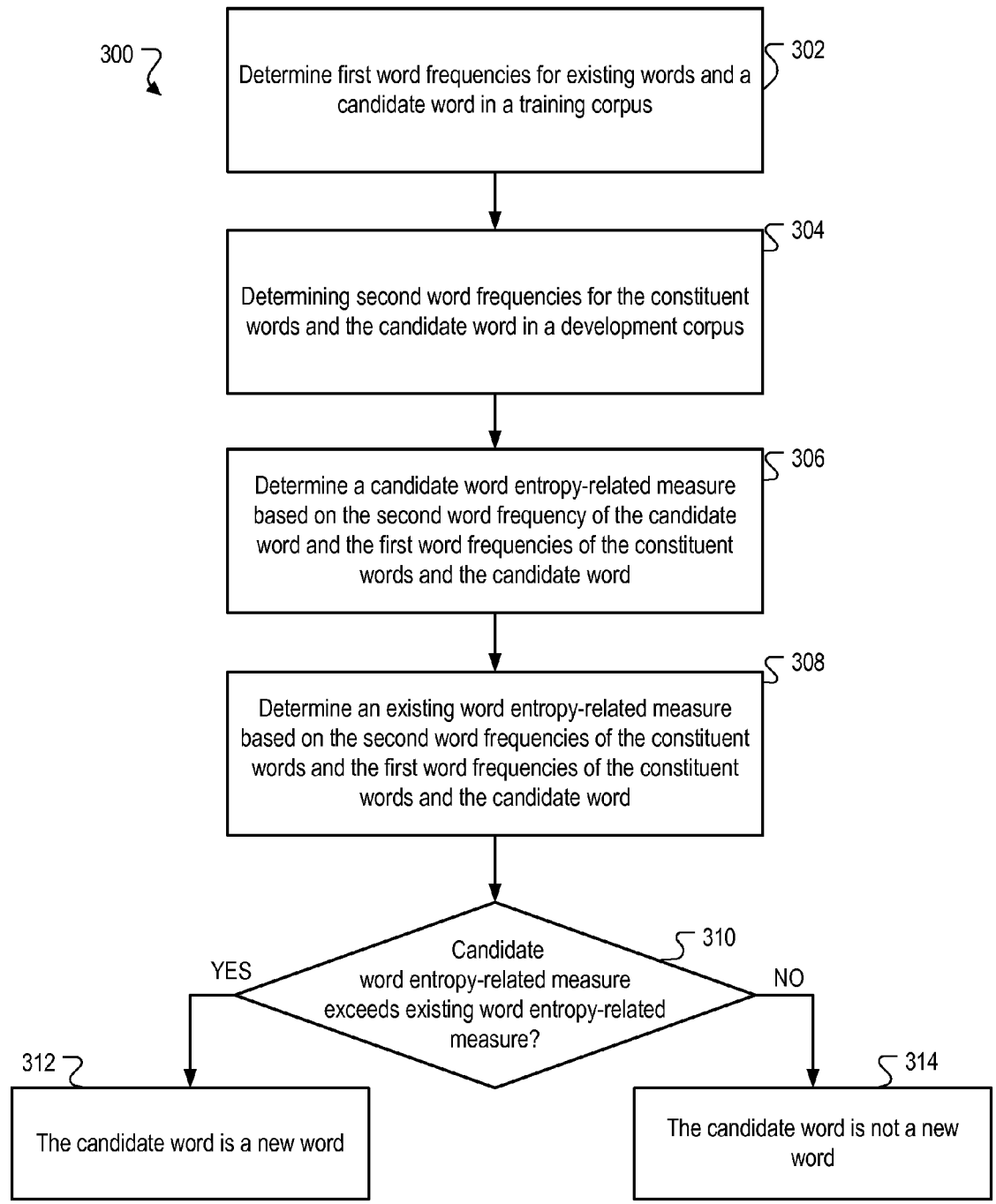
FIG. 3 is a flow chart of an example process for identifying new words in a word corpus.

FIG. 3 is a flow chart of an example process 300 for identifying new words in a word corpus (e.g., the word corpus 204). The process 300 can, for example, be implemented in a system that includes one or more computers. For example, the word detection system 200 can be used to perform some or all of the operations in the process 300.

The process 300 begins with determining first word frequencies for existing words and a candidate word in a training corpus (302). The candidate word can be defined by a sequence of constituent words, and each constituent word can be an existing word in a dictionary. For example, the word processing module 206 can determine probabilities (e.g., p(x), p(y), and p(x, y)) of a candidate word (e.g., (x, y)) and the existing words that constitute the candidate word (e.g., x and y) in the training corpus 232. In some implementations, the word processing module 206 can generate an n-gram language model in the training corpus 232 to determine the word frequencies.

Next, the process 300 determines second word frequencies for the constituent words and the candidate word in a development corpus (304). For example, the word processing module 206 can determine word count values of the identified new word and the constituent words in the development corpus 234 (e.g., D(x, y), D(x), and D(y)). In some implementations, the word frequency of a word in the development corpus 234 can be determined by dividing the word count of the word in the development corpus 234 by the total number of words in the development corpus 234. For example, the word processing module 206 can determine a word frequency of w in the development corpus by computing $$\frac{D(w)}{\|D\|}.$$

After determining the word frequencies, the process 300 determines a candidate word entropy-related measure based on the second word frequency of the candidate word and the first word frequencies of the constituent words and the candidate word (306). For example, the new word analyzer module 208 can determine the candidate word entropy-related measure V1 using D(x, y), p(x), p(y), and p(x, y).

The process 300 determines an existing word entropy-related measure based on the second word frequency of the constituent words and the first word frequencies of the constituent words and the candidate word (308). For example, the new word analyzer module 208 can determine an existing word entropy-related measure V2 using D(x), D(y), p(x), p(y), and p(x, y).

Next, the process 300 determines whether the candidate word entropy-related measure exceeds the existing word entropy-related measure (310). For example, the new word analyzer module 208 can compare V1 and V2 and determine whether V1 is greater than V2.

If the process 300 determines that the candidate word entropy-related measure exceeds the existing word entropy-related measure, the candidate word is determined to be a new word (312). For example, the new word analyzer module 208 can determine that the candidate word is a new word if V1>V2.

If the process 300 determines that the candidate word entropy-related measure does not exceed the existing word entropy-related measure, the candidate word is determined not to be a new word (314). For example, the new word analyzer module 208 can determine that the candidate word is not a new word if V1≦V2.

In some implementations, the entropy-related measures are determined by computing the entropy measure or by approximating the entropy measure using fixed sizes of the corpora as described with reference to FIGS. 2A-2B.

Figure 4:
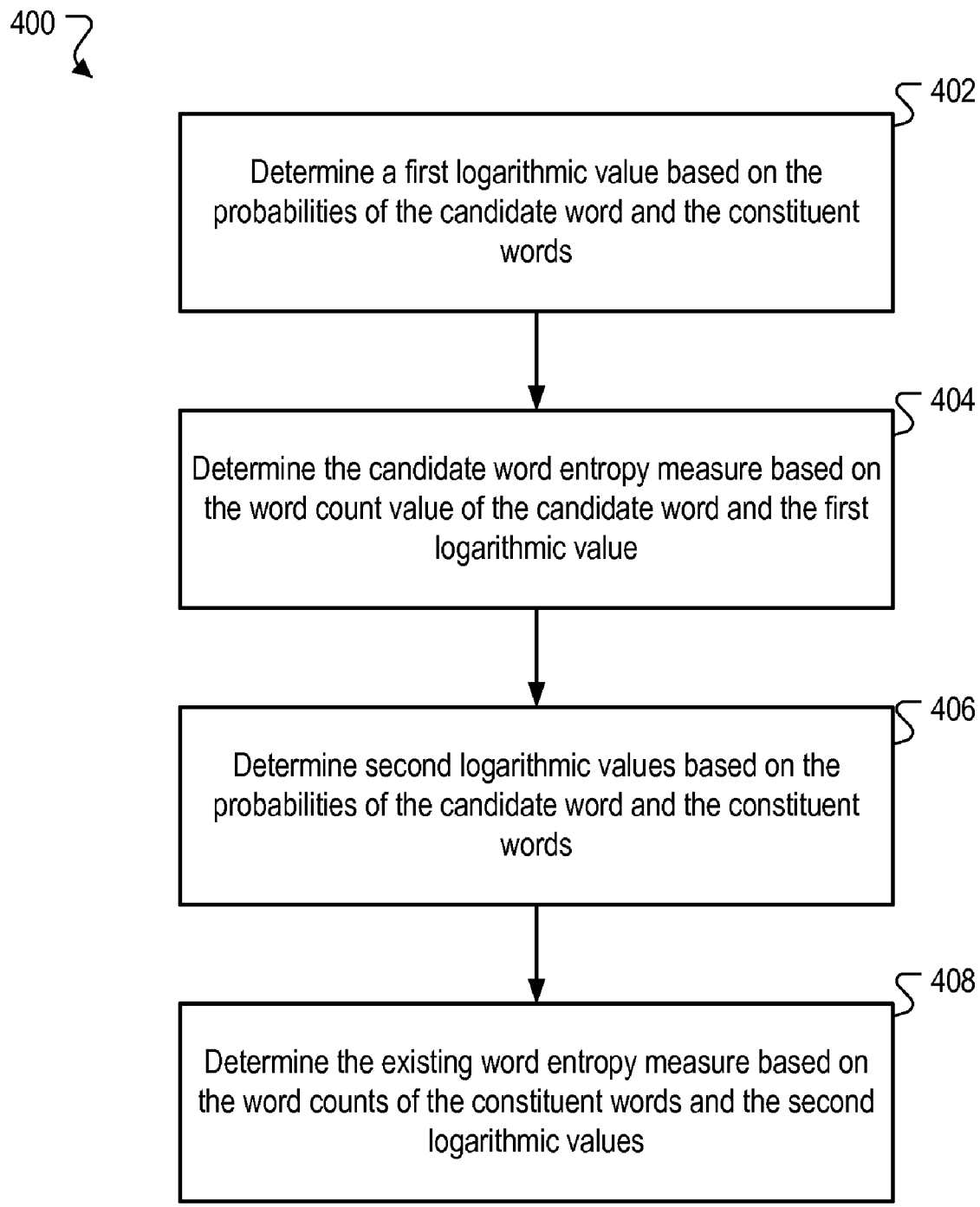
FIG. 4 is a flow chart of an example process for determining entropy-related measures for candidate words and existing words.

FIG. 4 is a flow chart of an example process 400 for determining entropy-related measures for candidate words and existing words. For example, the process 400 can be implemented in a system that includes one or more computers. For example, the word detection system 200 can be used to perform some or all of the operations in the process 400.

The process 400 begins with determining a first logarithmic value based on the probabilities of the candidate word and the constituent words (402). For example, the new word analyzer module 208 can determine a first logarithmic value using p(x), p(y), and p(x, y). In one example, the first logarithmic value can be $$\log \frac{p(x, y)}{p(x) \cdot p(y)}$$

Next, the process 400 determines the candidate word entropy measure based on the word count value of the candidate word and the first logarithmic value (404). For example, the new word analyzer module 208 can use the word count of the candidate word D(x, y) and the first logarithmic value to generate the value V1.

The process 400 determines second logarithmic values based on the probabilities of the candidate word and the constituent words (406). For example, the new word analyzer module 208 can determine second logarithmic values using p(x), p(y), and p(x, y). For example, the second logarithmic values can include $$\log \frac{p(x)}{p(x) - p(x, y)} \text{ and } \log \frac{p(y)}{p(y) - p(x, y)}$$

Next, the process 400 determines the existing word entropy measure based on the word counts of the constituent words and the second logarithmic values (408). For example, the new word analyzer module 208 can use the word count of the candidate word D(x), D(y) and the second logarithmic value to generate the value V2.

Figure 5:
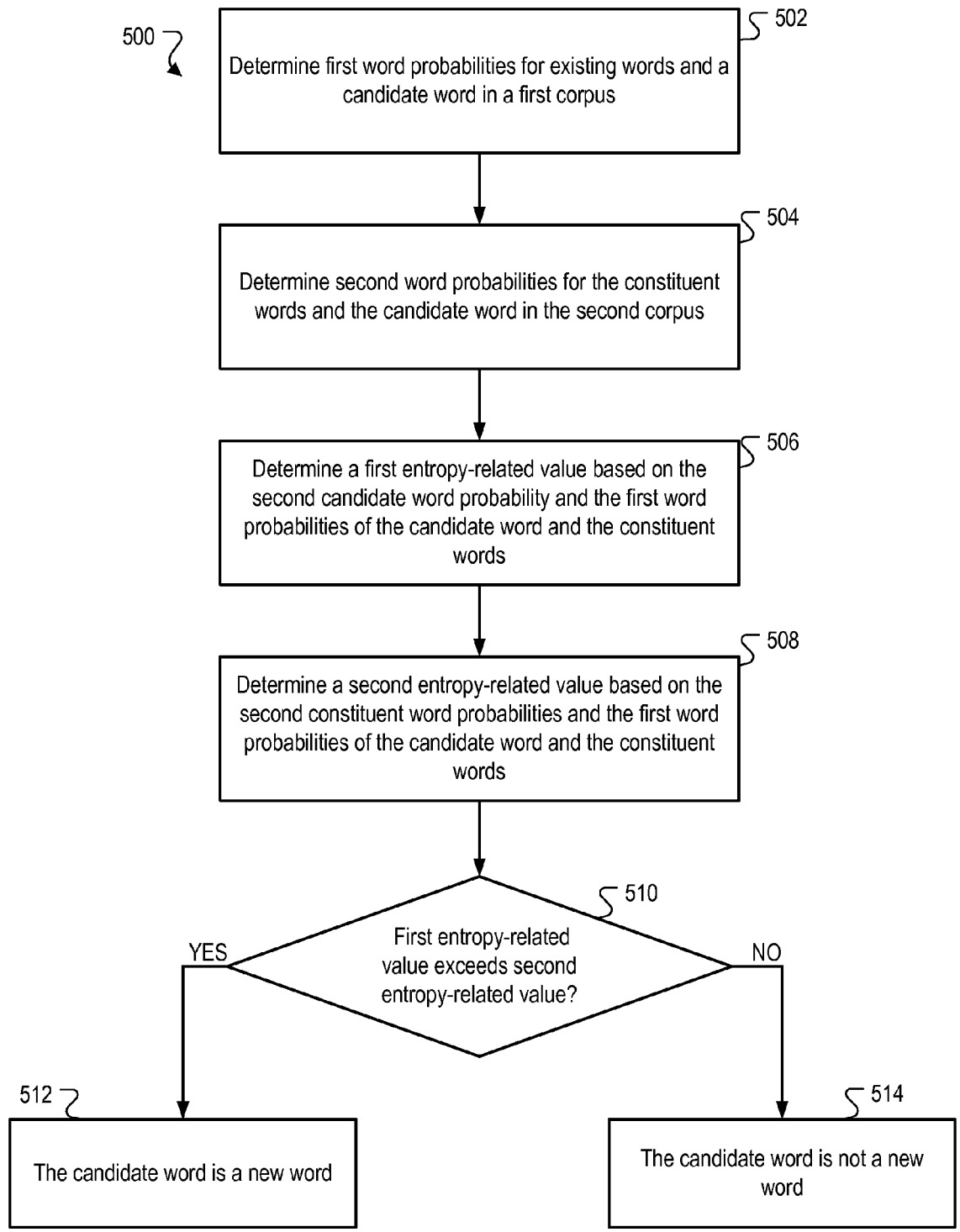
FIG. 5 is a flow chart of another example process for identifying new words in a word corpus.

FIG. 5 is a flow chart of another example process 500 for identifying new words in a word corpus. For example, the process 500 can be implemented in the system 200. The process 500 begins with determining first word probabilities for existing words and a candidate word in a first corpus (502). For example, the word processing module 206 can determine p(x), p(y), and p(x, y) in the training corpus 232.

The process 500 determines second word probabilities for the constituent words and the candidate word in the second corpus (504). The candidate word can be defined by a sequence of constituent words, and each constituent word can be an existing word in a dictionary. For example, the word processing module 206 can determine the probabilities of the constituent words, x and y, and the candidate word (x, y) in the development corpus 234. For example, the word processing module 206 can use D(x), D(y), and D(x, y) in the development corpus 234, and ||D|| to determine the probabilities of x, y, and (x, y) in the development corpus 234.

Next, the process 500 determines a first entropy-related value based on the second candidate word probability and the first word probabilities of the candidate word and the constituent words (506). For example, the new word analyzer module 208 can determine V1 using D(x, y) and p(x), p(y), and p(x, y).

The process 500 determines a second entropy-related value based on the second constituent word probabilities and the first word probabilities of the candidate word and the constituent words (508). For example, the new word analyzer module 208 can determine V2 using D(x), D(y), and p(x), p(y), and p(x, y).

After determining the entropy-related values, the process 500 determines whether the first entropy-related value exceeds the second entropy-related value (510). For example, the new word analyzer module 208 can determine whether V1>V2.

If the process 500 determines that the first entropy-related value V1 exceeds the second entropy-related value V2, the candidate word is determined to be a new word (512). For example, the new word analyzer module 208 can determine that the candidate word is a new word if V1>V2.

If the process 500 determines that the first entropy-related value does not exceed the second entropy-related value, the candidate word is determined not to be a new word (514). For example, the new word analyzer module 208 can determine that the candidate word is not a new word if V1≦V2.

Figure 6:
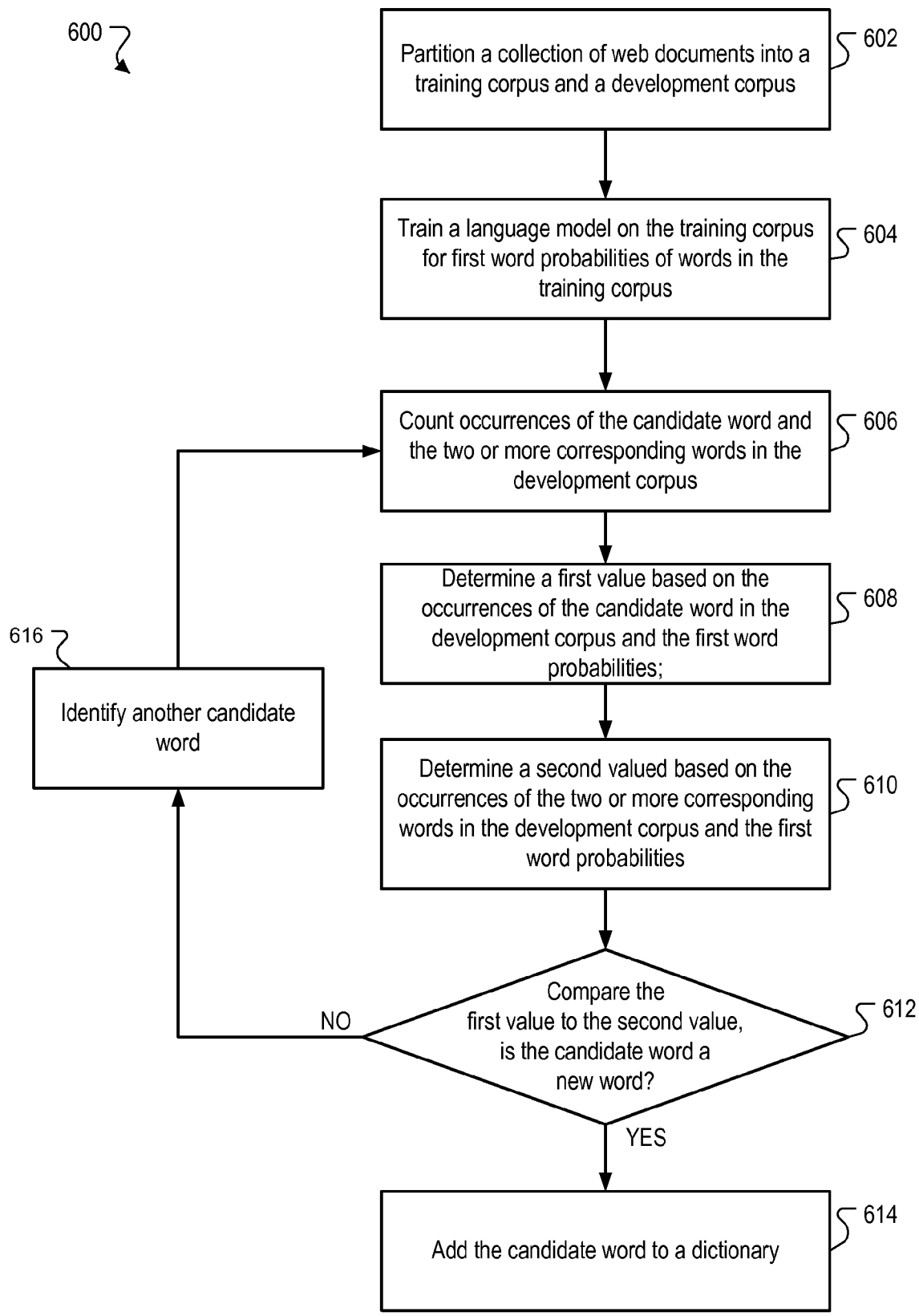
FIG. 6 is a flow chart of another example process for identifying new words in a word corpus based on word probabilities from another word corpus.

FIG. 6 is a flow chart of another example process 600 for identifying new words in a word corpus based on word probabilities from another word corpus. For example, the process 400 can be implemented in a system that includes one or more computers.

The process 600 begins with partitioning a collection of web documents into a training corpus and a development corpus (602). For example, the word processing module 206 can partition the word corpus 204 into the training corpus 232 and the development corpus 234.

Next, the process 600 trains a language model on the training corpus for first word probabilities of words in the training corpus (604). For example, the word training module 206 can train an n-gram language model of the training corpus 232 and obtain probabilities of words (e.g., p(x), p(y), and p(x, y)) in the training corpus 232.

The process 600 counts occurrences of the candidate word and the two or more corresponding words in the development corpus (606). For example, the word processing module 206 can count occurrences of the candidate word D(x, y) and the constituent words of the candidate word D(x) and D(y) in the development corpus 234.

Next, the process 600 determines a first value based on the occurrences of the candidate word in the development corpus and the first word probabilities (608). For example, the new word analyzer module 208 determines V1 based on D(x, y) and p(x), p(y), and p(x, y).

The process 600 determines a second value based on the occurrences of the two or more corresponding words in the development corpus and the first word probabilities (610). For example, the new word analyzer module 208 determines V2 based on D(x) and D(y), and p(x), p(y), and p(x, y).

After determining the first and second values, the process 600 determines whether the candidate word is a new word by comparing the first value to the second value (612). For example, the new word analyzer module 208 can compare V1 and V2. If the process 600 determines that the candidate word is a new word, then the process 600 adds the candidate word to a dictionary (614). For example, the dictionary updater module 210 can add the new word to the dictionary 124. If the process 600 determines that the candidate word is not a new word, then the process 600 identifies another candidate word (616) and the step 606 is repeated. For example, the word processing module 206 can identify another candidate word from the word corpus 204.

Although the examples of detecting a new word is described above with reference to two existing words, the word detection system 200 can detect new words constituting more than two existing words. For example, the word detection system 200 can identify a candidate word (x, y, z) that constitutes three existing words, x, y, and z. The new word analyzer module 208 can generate a first entropy related value V1 by computing $$V1 = \frac{D(x, y, z)}{\|D\|} \cdot \log\frac{p(x, y, z)}{p(x) \cdot p(y) \cdot p(z)}$$

and a second entropy related value V2 by computing $$V2 = \frac{D(x)}{\|D\|} \cdot \log\frac{p(x)}{p(x) - p(x, y)} + \frac{D(y)}{\|D\|} \cdot \log\frac{p(y)}{p(y) - p(x, y, z)} + \frac{D(z)}{\|D\|} \cdot \log\frac{p(z)}{p(z) - p(x, y, z)}$$

If V1>V2, the new word analyzer module 208 can determine that the candidate word (x, y, z) is a new word and the dictionary updater module 210 can store the new word in the dictionary 124. For example, the system 200 can identify the following new three-character words/phrases that have been introduced into a language lexicon: "丁俊" (ding junhui); "本赛季" (this season); "世锦赛" (world championship); "季后赛" (play off); "范甘迪" (Van Cundy); "国际足联" (FIFA); "反倾销" (anti dumping of low-priced), "净" (net profit); "证监会" (SEC); "国资委" (China federal estate committee); "美联储" (FED); and "非流通股" (Non-tradable shares).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   determining, by one or more computers, first word frequencies for existing words and a candidate word in a training corpus, the candidate word defined by a sequence of constituent words, each constituent word being an existing word in a dictionary;
   determining, by the one or more computers, second word frequencies for the constituent words and the candidate word in a development corpus;
   determining, by the one or more computers, a candidate word entropy-related measure based on the second word frequency of the candidate word and the first word frequencies of the constituent words and the candidate word;
   determining, by the one or more computers, an existing word entropy-related measure based on the second word frequencies of the constituent words and the first word frequencies of the constituent words and the candidate word; and
   determining, by the one or more computers, that the candidate word is a new word if the candidate word entropy-related measure exceeds the existing word entropy-related measure.

2. The method of claim 1, wherein the training corpus and the development corpus comprise web documents.

3. The method of claim 1, further comprising adding the candidate word to a dictionary of existing words if the candidate word is determined to be a new word.

4. The method of claim 1, wherein:
   determining first word frequencies comprises training a language model for probabilities of the existing words and the candidate words in the training corpus; and
   wherein determining second word frequencies comprises determining a word count value for each of the constituent words and the candidate word in the development corpus.

5. The method of claim 4, wherein:
   determining a candidate word entropy-related measure comprises:
      determining a first logarithmic value based on the probabilities of the candidate word and the constituent words; and
      determining the candidate word entropy-related measure based on the word count value of the candidate word and the first logarithmic value; and
   determining an existing word entropy-related measure comprises:
      determining second logarithmic values based on the probabilities of the candidate word and the constituent words; and
      determining the existing word entropy-related measure based on the word counts of the constituent words and the second logarithmic values.

6. The method of claim 1, wherein the words each comprise one or more Hanzi characters.

7. The method of claim 1, wherein the words each comprise one or more logographic characters.

8. The method of claim 1, further comprising:
updating the dictionary with the candidate word if the candidate word is determine to be a new word.

9. A computer-implemented method, comprising:
determining, by one or more computers, first word probabilities for existing words and a candidate word in a first corpus, the candidate word defined by a sequence of constituent words, each constituent word being an existing word in a dictionary;
determining, by the one or more computers, second word probabilities for the constituent words and the candidate word in a second corpus;
determining, by the one or more computers, a first entropy-related value based on the second candidate word probability and the first word probabilities of the candidate word and the constituent words;
determining, by the one or more computers, a second entropy-related value based on the second constituent word probabilities and the first word probabilities of the candidate word and the constituent words; and
determining, by the one or more computers, that the candidate word is a new word if the first entropy-related value exceeds the second entropy-related value.

10. The method of claim 9, wherein identifying a word corpus comprises identifying web documents.

11. The method of claim 9, wherein:
determining first word probabilities comprises training a language model on the first corpus for word probabilities of the existing words and the candidate word in the first corpus; and
determining second word probabilities comprises determining word count values for each of the constituent words and candidate word.

12. The method of claim 11, wherein:
determining a first entropy-related value comprises:
determining a first logarithmic value based on the first word probabilities of the candidate word and the constituent words; and
determining the first entropy-related value based on the word count value of the candidate word and the first logarithmic value; and
determining the second entropy-related value comprises:
determining second logarithmic values based on the first word probabilities of the candidate word and the constituent words; and
determining the second entropy-related value based on the word counts of the constituent words and the second logarithmic values.

13. The method of claim 9, wherein the words each comprise one or more Hanzi characters.

14. A computer-implemented method, comprising:
partitioning, by the one or more computers, a collection of web documents into a training corpus and a development corpus;
training, by the one or more computers, a language model on the training corpus for first word probabilities of words in the training corpus, wherein the words in the training corpus include a candidate word defined by a sequence of two or more corresponding words in the training corpus, the two or more corresponding words existing words in a dictionary;
counting, by the one or more computers, occurrences of the candidate word and the two or more corresponding words in the development corpus;
determining, by the one or more computers, a first value based on the occurrences of the candidate word in the development corpus and the first word probabilities;
determining, by the one or more computers, a second valued based on the occurrences of the two or more corresponding words in the development corpus and the first word probabilities;
comparing, by the one or more computers, the first value to the second value; and
determining, by the one or more computers, whether the candidate word is a new word based on the comparison.

15. The method of claim 14, further comprising adding the candidate word to the dictionary if the candidate word is determined to be a new word.

16. The method of claim 14, wherein training a language model on the training corpus for first word probabilities of words in the training corpus comprises training an n-gram language model.

17. The method of claim 16, wherein:
determining a first value based on the occurrences of the candidate word in the development corpus and the first word probabilities corpus comprises:
determining a first logarithmic value based on the first word probability for the candidate word and the first word probabilities of the two or more corresponding words; and
multiplying the first logarithmic value by the counted occurrences of the candidate word; and
wherein determining a second valued based on the occurrences of the two or more corresponding words in the development corpus and the first word probabilities comprises:
determining second logarithmic values based on the first word probability of the candidate word and the first word probabilities of the two or more corresponding words; and
multiplying the second logarithmic values by the counted occurrences of the two or more corresponding words.

18. The method of claim 17, wherein the words each comprise one or more Hanzi characters.

19. A system, comprising:
a word processing module comprising computer instructions stored in a computer readable medium, and upon execution by a computer device configured to access and partition a word corpus into a training corpus and a development corpus, and to generate:
first word probabilities for words stored in the training corpus, the words including a candidate word comprising two or more corresponding words;
second word probabilities for the words in the development corpus;
a new word analyzer module comprising computer instructions stored in a computer readable medium, and upon execution by a computer device configured to process the first and second word probabilities and generate:
a first value based on the first word probabilities for the candidate word and the two or more corresponding words and the second word probability for the candidate word; and
a second value based on the first word probabilities for the candidate word and the two or more corresponding words and the second word probabilities for the two or more corresponding words;
and further configured to compare the first value to the second value and determine whether the candidate word is a new word based on the comparison.

20. The system of claim 19, further comprising a dictionary updater module comprising computer instructions stored in a computer readable medium, and upon execution by a computer device configured to update a dictionary with identified new words.

21. The system of claim 19, wherein the word processing module comprises an n-gram language model.

22. The system of claim 19, wherein the first and second values are entropy-related values.

23. The system of claim 19, wherein the word corpus comprises web documents.

24. The system of claim 19, wherein the word processing module comprises a Hanzi character processing module.

25. The system of claim 24, wherein each word comprises one or more Hanzi characters.

26. An apparatus comprising software stored in a computer readable medium, the software comprising computer readable instructions executable by a computer processing device and that upon such execution cause the computer processing device to:
- determine first word frequencies for existing words and a candidate word in a training corpus, the candidate word defined by a sequence of constituent words, each constituent word an existing word, and each existing word a word existing in a dictionary;
- determine second word frequencies for the constituent words and the candidate word in a development corpus;
- determine a candidate word entropy-related measure based on the second word frequency of the candidate word and the first word frequencies of the constituent words and the candidate word;
- determine an existing word entropy-related measure based on the second word frequencies of the constituent words and the first word frequencies of the constituent words and the candidate word; and
- determine that the candidate word is a new word if the candidate word entropy-related measure exceeds the existing word entropy-related measure.

27. A system, comprising:
a data processing apparatus; and
a computer memory device storing instructions executable by the data processing apparatus and upon such execution cause the data processing apparatus to perform operations comprising:
determining first word probabilities for existing words and a candidate word in a first corpus, the candidate word defined by a sequence of constituent words, each constituent word being an existing word, and each existing word being a word existing in a dictionary;
determining second word probabilities for the constituent words and the candidate word in a second corpus;
determining a first entropy-related value based on the second word probability of the candidate word and the first word probabilities of the candidate word and the constituent words;
determining a second entropy-related value based on the second word probabilities of the constituent words and the first word probabilities of the candidate word and the constituent words; and
determining whether the candidate word is a new word based on a comparison between the first entropy-related value and the second entropy-related value.

28. A system, comprising:
a data processing apparatus; and
a computer memory device storing instructions executable by the data processing apparatus and upon such execution cause the data processing apparatus to perform operations comprising:
access and partition a word corpus into a training corpus and a development corpus;
generate first word probabilities for words stored in the training corpus, the words including a candidate word comprising two or more corresponding words;
generate second word probabilities for the words in the development corpus;
generate a first value based on the first word probabilities for the candidate word and the two or more corresponding words and the second word probability for the candidate word;
generate a second value based on the first word probabilities for the candidate word and the two or more corresponding words and the second word probabilities for the two or more corresponding words; and
compare the first value to the second value and determine whether the candidate word is a new word based on the comparison.

* * * * *